(12) United States Patent
Jayanthi et al.

(10) Patent No.: US 11,636,071 B2
(45) Date of Patent: Apr. 25, 2023

(54) DATABASE REPLICATION ERROR RECOVERY BASED ON SUPERVISED LEARNING

(71) Applicant: salesforce.com, inc., San Francisco, CA (US)

(72) Inventors: Swaroop Jayanthi, Hyderabad (IN); Janakirama Raju Mantena, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 239 days.

(21) Appl. No.: 16/739,729

(22) Filed: Jan. 10, 2020

(65) Prior Publication Data

US 2021/0216509 A1 Jul. 15, 2021

(51) Int. Cl.
*G06F 16/00* (2019.01)
*G06N 20/00* (2019.01)
(Continued)

(52) U.S. Cl.
CPC ...... *G06F 16/1844* (2019.01); *G06F 11/0772* (2013.01); *G06F 11/1464* (2013.01);
(Continued)

(58) Field of Classification Search
CPC .... G06F 16/214; G06F 16/20; G06F 16/1873; G06F 16/1734; G06F 16/1844;
(Continued)

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

WO WO2010068570 A1 * 6/2010
WO WO2011150391 A1 * 12/2011
(Continued)

OTHER PUBLICATIONS

Bo Liu et al., "A Vector Matrix Iterative Self-Organizing Assistant Clustering Algorithm of XML Document", The 9th International Conference for Young Computer Scientists,2008, pp. 1629-1634.*
(Continued)

*Primary Examiner* — Srirama Channavajjala
(74) *Attorney, Agent, or Firm* — Kwan & Olynick LLP

(57) ABSTRACT

System and methods are described for automated recovery from errors occurring during replication of a database. The method includes getting text from one or more log files generated during database replication processing in a cloud computing environment, transforming the text into a structured language form represented by vectors, and identifying patterns in the vectors. The method further includes classifying one or more errors based on the identified patterns using supervised learning as either a recoverable error or an unrecoverable error, analyzing the one or more errors to determine one or more recovery jobs associated with database replication processing in the cloud computing environment for each of the recoverable errors, and invoking the one or more recovery jobs.

21 Claims, 11 Drawing Sheets

(51) Int. Cl.
*G06F 16/182* (2019.01)
*G06F 16/17* (2019.01)
*G06K 9/62* (2022.01)
*G06F 11/07* (2006.01)
*G06F 11/30* (2006.01)
*G06F 11/14* (2006.01)
*G06F 16/22* (2019.01)

(52) U.S. Cl.
CPC ...... *G06F 11/3034* (2013.01); *G06F 16/1734* (2019.01); *G06F 16/2264* (2019.01); *G06F 16/2291* (2019.01); *G06K 9/6264* (2013.01); *G06N 20/00* (2019.01)

(58) Field of Classification Search
CPC ............... G06F 16/2452; G06F 16/289; G06F 16/2264; G06F 16/2291; G06F 16/284; G06F 11/0772; G06F 11/1464; G06F 11/3034; G06F 11/0793; G06F 11/079; G06F 11/0706; G06F 11/142; G06F 11/0751; G06F 11/0781; G06F 11/0787; G06F 3/1234; G06N 20/00; G06N 20/20; G06N 20/04; G06N 20/045; G06N 20/08
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,558,820 B2* | 7/2009 | Kimoto .................. A63F 13/12 709/203 |
| 7,620,655 B2 | 11/2009 | Larsson et al. |
| 8,495,429 B2* | 7/2013 | Fu ...................... G06F 11/3608 714/38.1 |
| 9,578,063 B1* | 2/2017 | Iyer ...................... H04L 63/102 |
| 10,261,853 B1* | 4/2019 | Chen .................. G06F 11/0727 |
| 10,846,305 B2* | 11/2020 | Merriman ............. G06F 16/278 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0114401 A1* | 5/2005 | Conkel ................. G06F 11/327 |

(56) References Cited

U.S. PATENT DOCUMENTS

| | | | |
|---|---|---|---|
| 2007/0055914 A1* | 3/2007 | Chandwani | G06F 11/0715 714/47.2 |
| 2009/0177744 A1 | 7/2009 | Marlow et al. | |
| 2010/0268991 A1* | 10/2010 | Birch | G06F 11/2215 714/32 |
| 2013/0006932 A1* | 1/2013 | Akulavenkatavara | G06F 16/273 707/626 |
| 2015/0089280 A1* | 3/2015 | Sade | G06F 11/0793 714/6.12 |
| 2016/0078367 A1* | 3/2016 | Adjaoute | G06N 20/00 706/12 |
| 2016/0254957 A1* | 9/2016 | Maes | H04L 41/0886 709/223 |
| 2016/0335260 A1* | 11/2016 | Convertino | G06F 16/2358 |
| 2017/0308595 A1* | 10/2017 | Dey | G06F 16/283 |
| 2019/0065343 A1* | 2/2019 | Li | G06N 3/088 |
| 2019/0188260 A1* | 6/2019 | Hewitt | G06F 40/284 |
| 2020/0065476 A1* | 2/2020 | Boutnaru | G06F 21/46 |
| 2020/0285737 A1* | 9/2020 | Kraus | G06F 21/552 |
| 2020/0364609 A1* | 11/2020 | Scriven | G06F 40/40 |

FOREIGN PATENT DOCUMENTS

| | | | |
|---|---|---|---|
| WO | WO2013036871 A1 | * | 3/2013 |
| WO | WO2016048921 A1 | * | 3/2016 |

OTHER PUBLICATIONS

Lanyue Lu et al., "CARP: Handling Silent Data Errors and Site Failures in an Integrated Program and Storage Replication Mechanism", 29th IEEE International Conference on Distributed Computing Systems, Jul. 2009, pp. 385-394.*

Rasha Osman et al., "Quantifying the Impact of Replication on the Quality-of-Service in Cloud Databases", 2016 IEEE International Conference on Software Quality, Reliability and Security (QRS), Aug. 2016, pp. 286-297.*

Victor A. E. Farias et al., "Machine Learning Approach for Cloud NoSQL Databases Performance Modeling", 2016 16th IEEE/ACM International Symposium on Cluster, Cloud and Grid Computing (CCGrid), May 2016, pp. 617-620.*

* cited by examiner

DATABASE REPLICATION ERROR RECOVERY BASED ON SUPERVISED LEARNING

TECHNICAL FIELD

One or more implementations relate to database replication, and more specifically to identification, classification, and recovery from errors occurring during database replication in a distributed system of a cloud computing environment.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

The size of data used in the cloud is growing exponentially and maintaining the customer's data availability and consistency for cloud-based Software-as-a-Service (SaaS) applications is a major challenge. When providing a SaaS-based application in a cloud computing environment, ensuring high availability of customer data and meeting the service level agreements (SLAs) of the customers is a priority.

Database replication provides for replicating data from a source database to a target database. Data replication provides a mechanism for storing data across database instances in the cloud, thus enabling high availability of data across multiple cloud computing sites and supporting meeting of SLA of customer requirements in terms of data availability.

Errors may occur during database replication. Typically, information about errors is stored in a log file. Examining the log file to determine the cause of the errors and taking a remedial action, if possible, is a tedious and time-intensive task for a subject matter expert.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Embodiments of the present invention comprise a method and apparatus that analyzes data in log files to identify errors, and when possible takes one or more remedial actions. Embodiments transform raw text data in one or more log files into a structured language form represented by vectors, analyze the structured language to identify patterns, classify errors based on identified patterns using a supervised learning technique, and invoke one or more remedial actions (such as execution of recovery jobs) for recoverable errors. Embodiments notify one or more users of detected errors (including recoverable errors and unrecoverable errors), and invocation of recovers, jobs. Embodiments can be deployed on any hosted cloud computing service or in a private data center.

Figure 1A:
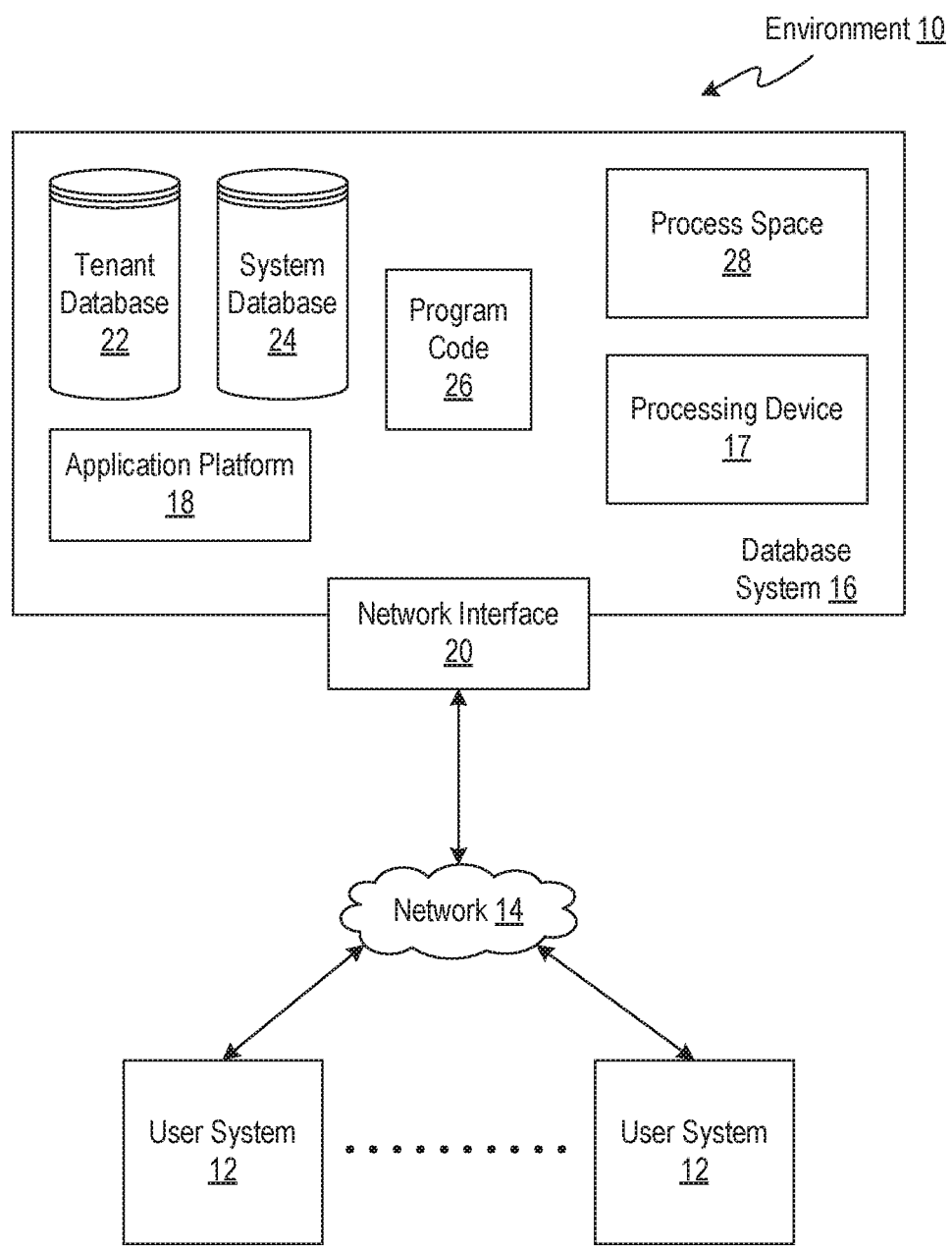
FIG. 1A illustrates an example computing environment of an on-demand database service according to some embodiments.

FIG. 1A illustrates a block diagram of an example of a cloud computing environment 10 in which an on-demand database service can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data (such as data sets), a system database 24 for storing system data, program code 26 for implementing various functions of the database system 16 (including a visual data cleaning application), and process space 28 for executing database system processes and tenant-specific processes, such as running applications for customers as part of an application hosting service. In some other implementations, environment 10 may not have all these components or systems, or may have other components or systems instead of, or in addition to, those listed above. In some embodiments, tenant database 22 is a shared storage.

In some implementations, environment 10 is a computing environment in which an on-demand database service (such as a distributed search application) exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

In some embodiments, application platform 18 includes a database replication error recovery controller 414 as described herein.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS), a relational database management system (RDBMS), or an unstructured DB such as "noSQL" as is well known in the art. It should also be understood that "server system", "server", "server node", and "node" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), Secure Sockets layer (SSL) etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications, and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), micro-drives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB Script, and many other programming languages as are well known.

Figure 1B:
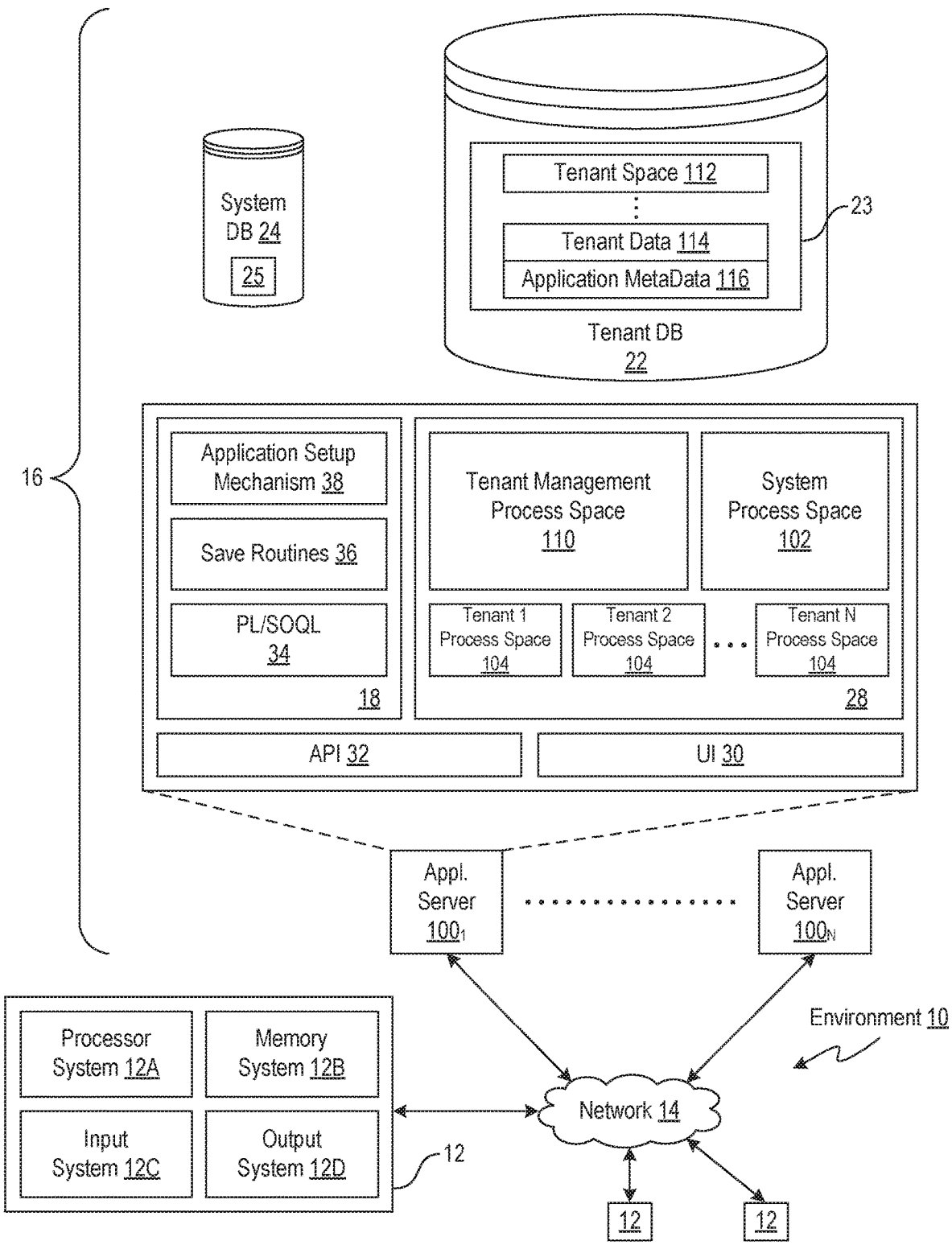
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers 100₁-100N. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 1002 can be coupled via a direct network link, and another application server 100N can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In some embodiments, server 100 includes a database replication error recovery controller 414 as described herein.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
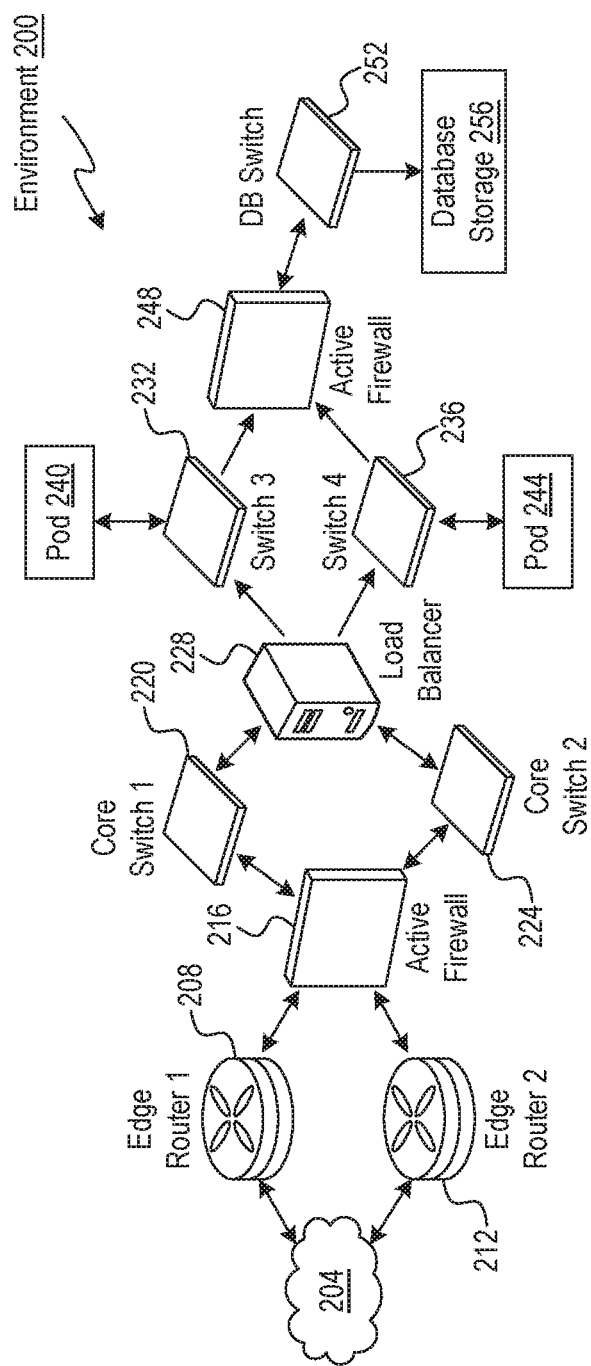
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
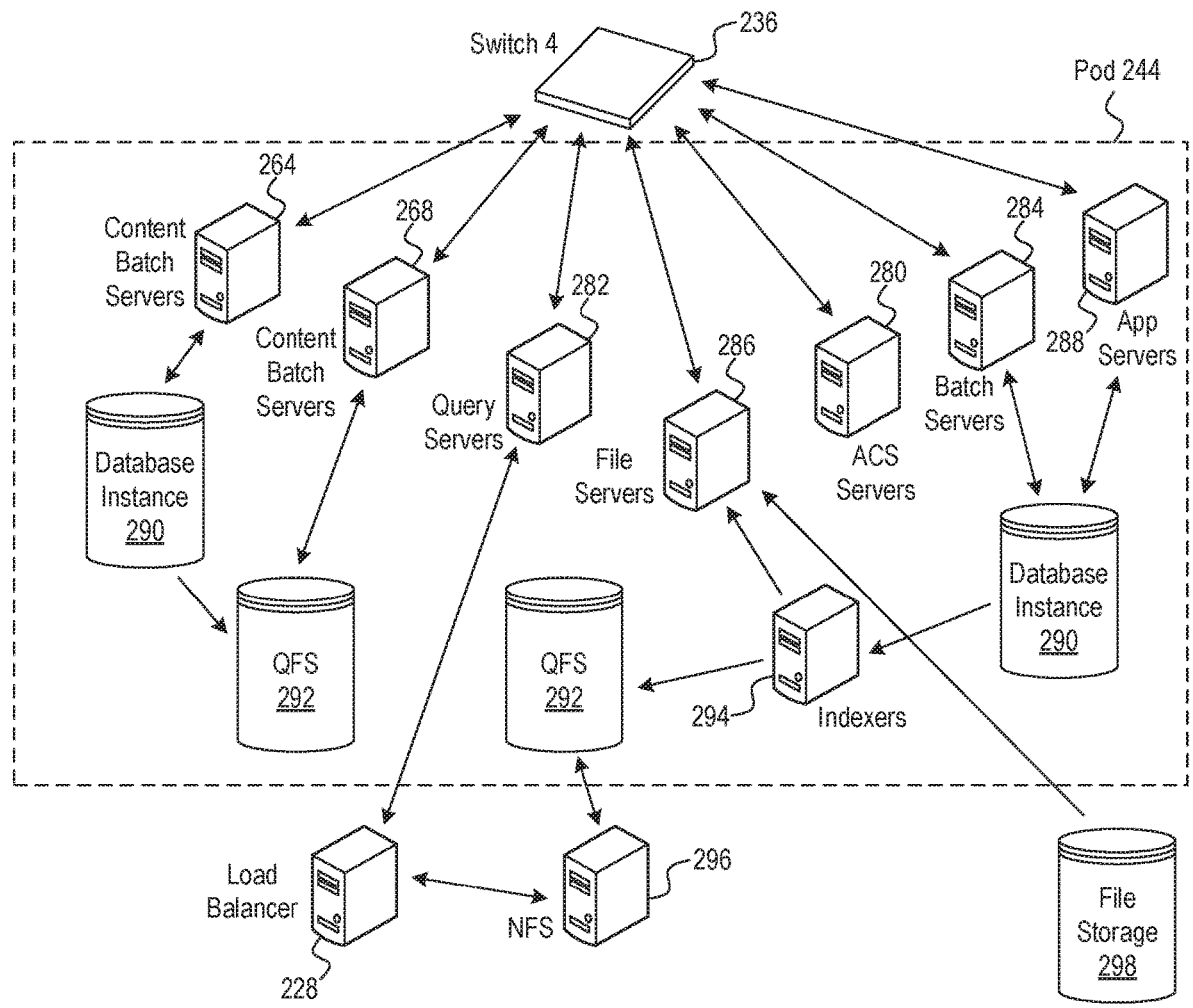
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multitenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

In an embodiment, replication manager 402 and database replication error recovery controller 414 as described below are executed by app servers 288.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). In some embodiments, file storage 298 is a shared storage. By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292. In some embodiments, there may be a plurality of database instances stored and accessed throughout the system.

Figure 3:
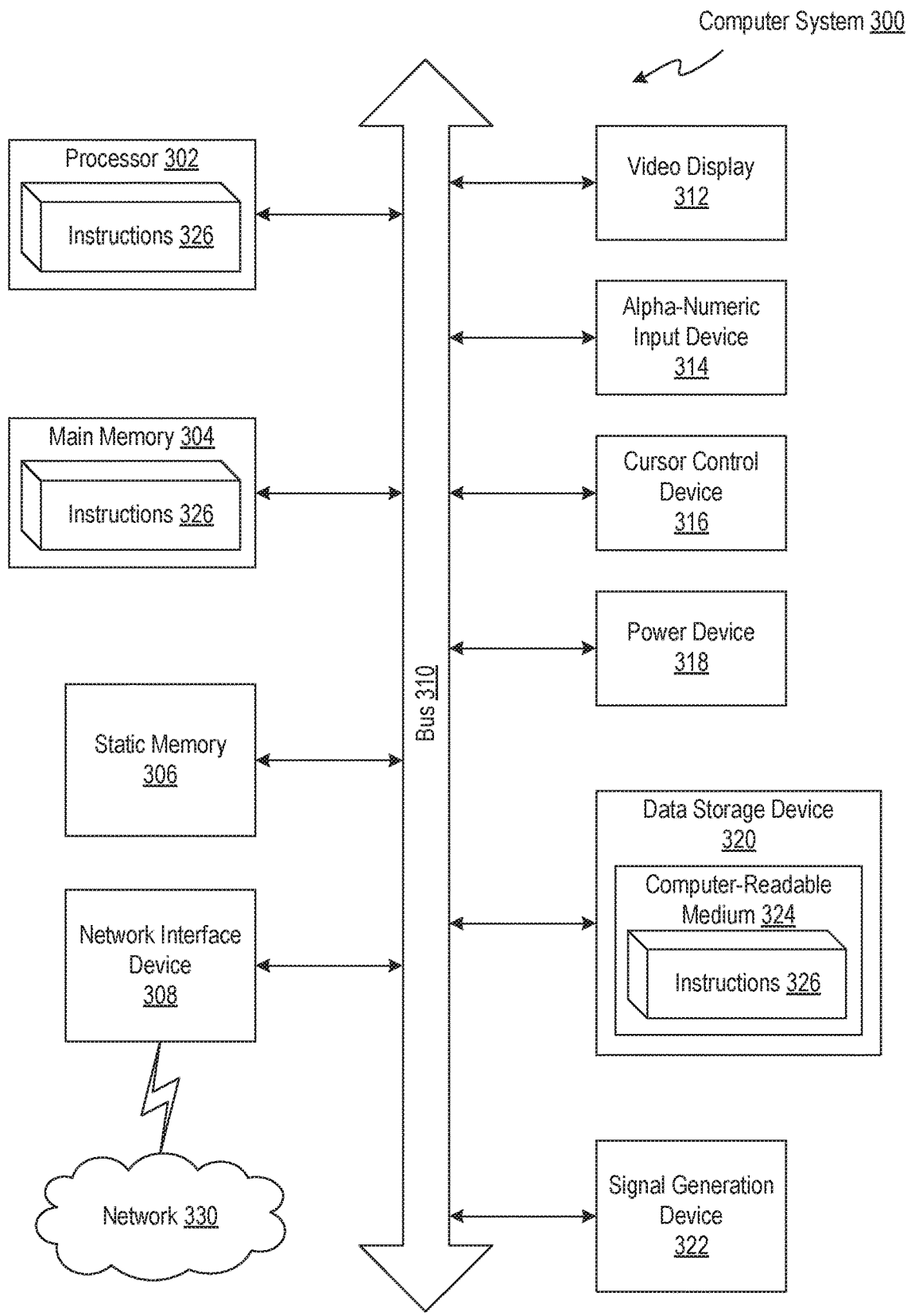
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loud speaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a tangible computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations of replication manager 402 and database replication error recovery controller 414 as described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Figure 4:
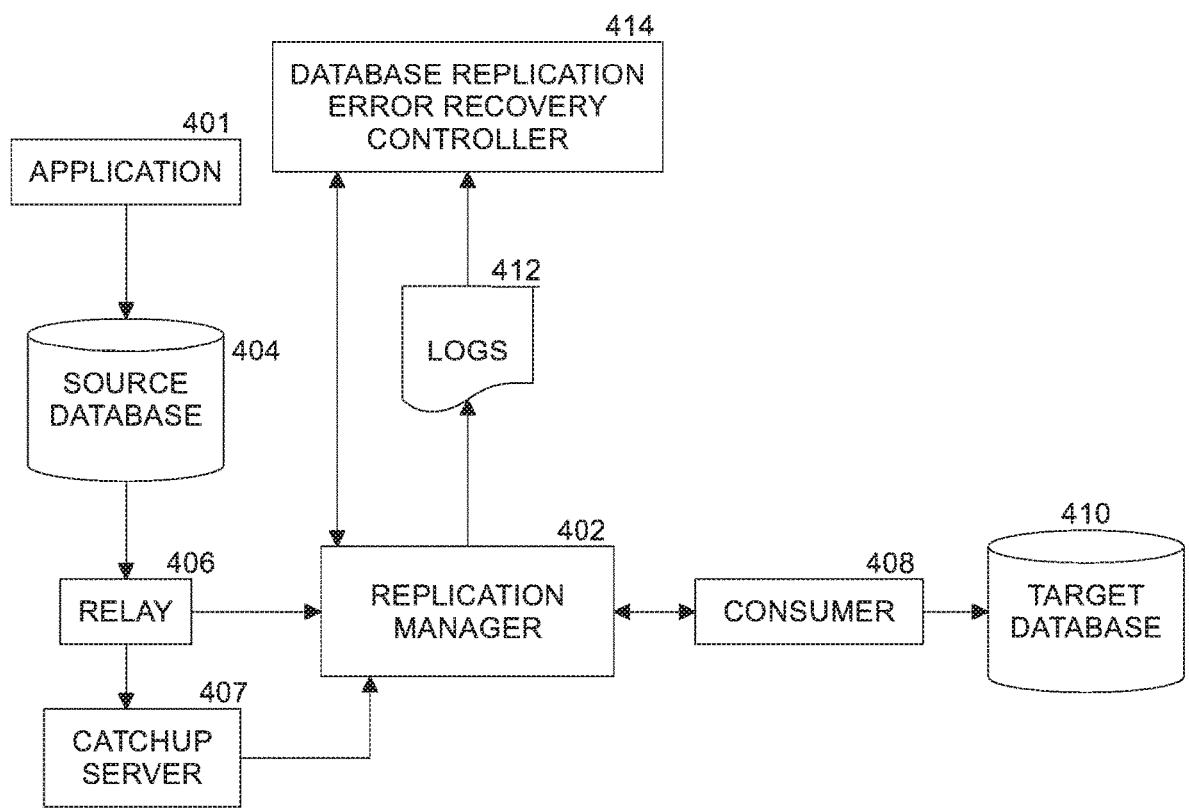
FIG. 4 is a diagram of database replication according to some embodiments.

Database replication is used in cloud computing environments to create a new target database as a copy of a source database. FIG. 4 is a diagram 400 of database replication according to some embodiments. Application 401 (such as application platform 18 of FIG. 1A) writes data to source database 404. Source database 404 is read by relay 406. Relay 406 is a service or process that fetches data from source database 404 based on transactional commit operations. Catchup server 407 persists the data (e.g., buffers the transactional data) when relay 406 is not responding. Catchup server 407 acts as a caching layer when the relay process is down or not responding. Replication manager 402 controls the database replication process to create target database 410 as a copy of source database 404 within cloud computing environment 10. Consumer 408 is a service or process that writes the data, based at least in part on batch sizes of transactions, that need to be committed to target database 410. While performing database replication processing, replication manager 402 writes data into one more log files (called logs 412 herein) to record the status of database replication processing. Logs 412 may include information about errors, if any, that occur during database replication processing. In an embodiment, the data is in an unstructured "raw" text format.

In existing computing systems, there is no mechanism for automatically classifying errors in log files as recoverable or unrecoverable by analyzing raw text data from the logs. Tracing the exact error and identifying the error as a recoverable error or an unrecoverable error has been done manually to understand the root cause of the error by a system administrator or database systems analyst having subject matter expertise for large scale database systems in a cloud computing environment. No proactive remedial action has been performed to automatically recover from recoverable errors.

Embodiments of the present invention overcome these and other challenges. Database replication error recovery controller 414 reads logs 412, analyzes the information contained in logs 412, and proactively takes one or more remedial actions (called recovery jobs herein) in response to detected recoverable errors that occurred during database replication processing. In an embodiment, a remedial action includes a call to replication manager 402 to re-execute one or more portions of database replication processing.

Figure 5:
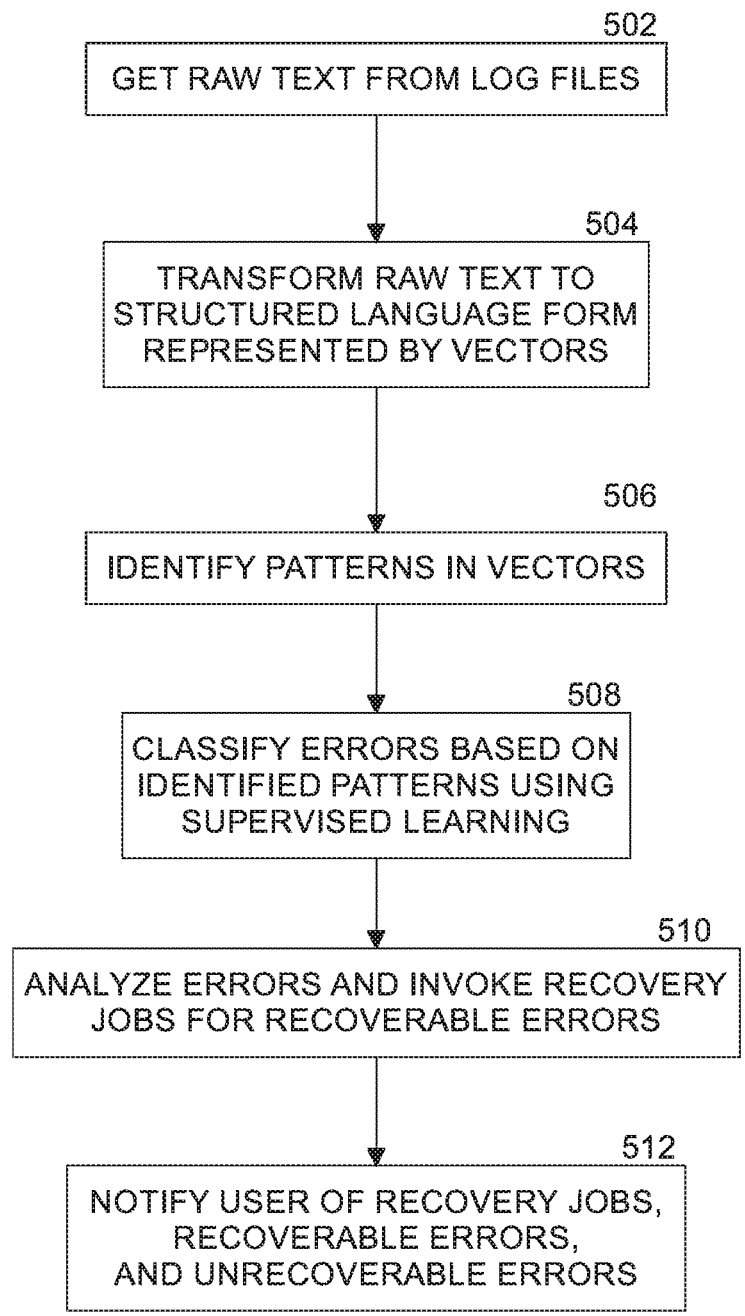
FIG. 5 is a flow diagram of example database replication error recovery processing according to some embodiments.

FIG. 5 is a flow diagram 500 of example database replication error recovery processing according to some embodiments. In an embodiment, the processing steps of flow diagram 500 are performed by database replication error recovery controller 414. At block 502, raw text is obtained from logs 412. At block 504, the text is transformed into a structured language form represented by vectors. In an embodiment, prior to transformation, the text is filtered to remove commonly used "stop" words, such as "the", "a", "an", "in" and so on. For example, if the text was "Error while determining connection generation java.lang.RuntimeException. Previous transaction was not committed or rolled back properly" then the text after filtering for stop words would be "Error determining connection generation java.lang.RuntimeException. Previous transaction committed rolled back properly."

In an embodiment, a vector comprises a knowledge-based vector representation. In an embodiment, a vector is a numerical representation of an object. For example, if a set of errors in logs 412 before removing stop words is:
E1: Unrecognized PBC error
E2: Error OutOfMemoryError—heap dump unrecognized policy error
E3: Error while determining connection generation: java.lang.RuntimeException: Previous transaction was not committed or rolled back properly
E4: Version mismatch for consumer with drivers
    Then after filtering out the stop words the set is:
    E1: Unrecognized PBC error
    E2: Error OutOfMemoryError heap dump unrecognized policy error
    E3: Error determining connection generation java.lang.RuntimeException Previous transaction committed rolled back properly
    E4: Version mismatch consumer drivers
A list is generated that represents the total unique tokens (words) from all the errors:
    ["unrecognized", "PBC", "error", "outOfMemoryError", "heap", "dump", "policy", "determining", "connection", "generation", "java.lang.RuntimeException", "previous", "transaction", "committed", "rollback", "properly", "version", "mismatch", "consumer", "drivers"]
Here E(Number of Errors)=4, and N(Number of unique words in list)=20.

In an embodiment, a count matrix M of size E×N is generated wherein each matrix element includes the count of the number of times that a word appears in the log file. Each row of the matrix (representing a particular error) can be represented as a vector. For example:
E1 vector representation=[1,1,1,0,0,0,0,0,0,0,0,0,0,0,0,0,0,0,0,0]
E2 vector representation=[1,0,2,1,1,1,1,0,0,0,0,0,0,0,0,0,0,0,0,0]
E3 vector representation=[0,0,1,0,0,0,0,1,1,1,1,1,1,1,1,1,0,0,0,0]
E4 vector representation=[0,0,0,0,0,0,0,0,0,0,0,0,0,0,0,0,1,1,1,1]

At block 506, patterns are identified in the vectors. At block 508, errors are classified based at least in part on the identified patterns using supervised learning. In an embodiment, errors are classified as either recoverable errors or unrecoverable errors using an error classification predictive model (ECPM). At block 510, the classified errors are analyzed to determine one or more recovery jobs associated with database replication processing in the cloud computing environment for each of the recoverable errors. The one or more recovery jobs are invoked for recoverable errors. A recovery job includes any action to related to one or more portions of data replication processing and/or processing by cloud computing environment 10. At block 512, one or more users are notified of recovery jobs (if any), recoverable errors (if any), and unrecoverable errors (if any).

Figure 6:
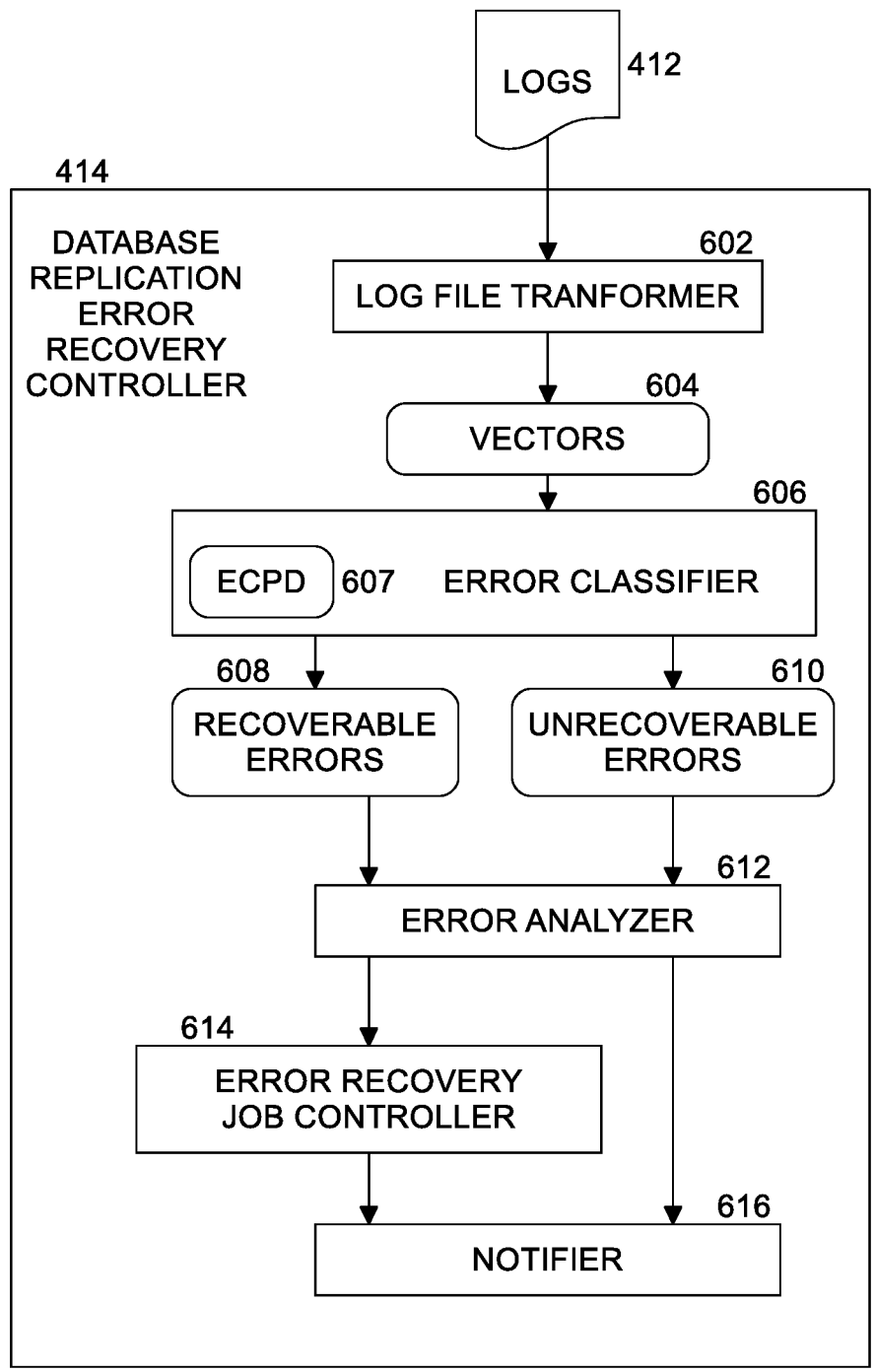
FIG. 6 is a diagram of an example database replication error recovery controller according to some embodiments.

FIG. 6 is a diagram of an example database replication error recovery controller 414 according to some embodiments. A mathematical representation of the processing of logs according to one embodiment is:

$$f(x) = \Sigma_{i=1}^{3} P_i(x) + J_0(x);$$

$J_0(x)=0$, if error s unrecoverable;

where $P_1(x)$ is a vector representation of log data, $P_2(x)$ is a database replication error classifier; $P_3(x)$ represents notifications/alerts to the cloud computing environment or to database administrators (DBAs); and $J_0(x)$ represents the recovery jobs performed in response to detection of recoverable errors.

Figure 7:
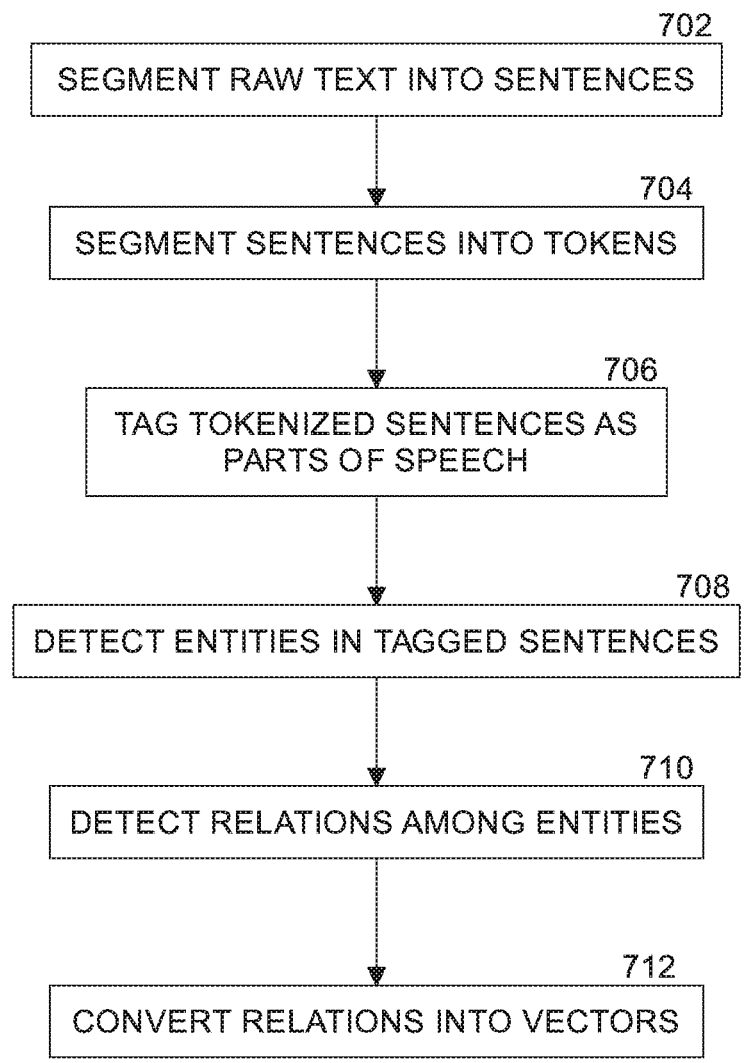
FIG. 7 is a flow diagram of example log file transformation processing according to some embodiments.

Log file transformer 602 parses raw text data in logs 412 and transforms the raw text data in vectors 604. FIG. 7 is a flow diagram 700 of example log file transformation processing according to some embodiments. At block 702, log file transformer 602 segments the raw text into sentences. At block 704, log file transformer 602 segments the sentences into tokens. At block 706, log file transformer 602 tags tokenized sentences as parts of speech. At block 708, log file transformer 602 detects entities in the tagged sentences. In an embodiment, an entity is a real-world object represented in a database. The entity can be any object, place, or person. Data about entities are stored in a database. At block 710, log file transformer 602 detects relations among the entities. A relation associates an entity to another entity. For example, assume an employee of an organization is an entity. If "Peter" is a programmer (e.g., an employee) he can have attributes (properties) like name, age, weight, height, etc. Entities can have relationships with each other. Assume that each programmer is given a computer. Thus, Peter's computer is also an entity. Peter is using that computer and the same computer is used by Peter. In other words, there is a mutual relationship among Peter and his computer. At block 712, log file transformer 602 converts the relations into vectors 604.

Figure 8:
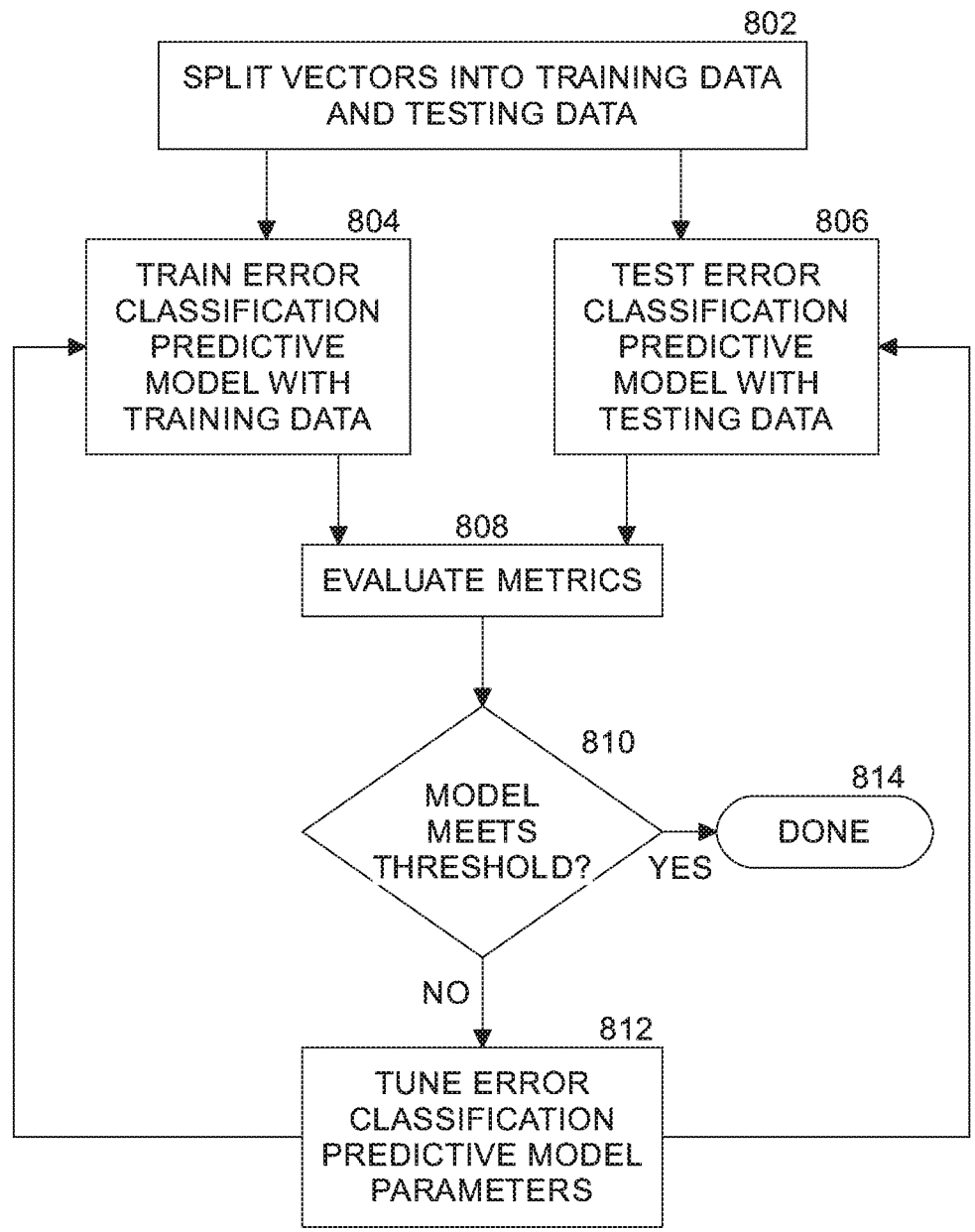
FIG. 8 is a flow diagram of example error classification predictive model training and testing according to some embodiments.

Returning back to FIG. 6, vectors 604 are input to error classifier 606. Error classifier 606 classifies errors based at least in part on the vectors. In an embodiment, error classifier 606 comprises an error classification predictive model (ECPM) 607 that takes vectors as input parameters and outputs error classifications. FIG. 8 is a flow diagram 800 of example error classification predictive model training and testing according to some embodiments. In an embodiment, predictive model 607 is tuned before applying the predictive model to vectors from production logs. Tuning improves the accuracy of subsequent error classification. At block 802, error classifier 606 splits vectors 604 into training data and testing data portions. Training data comprises a sample of data that is used to train the ECPM. Testing data is a sample that is used to generate an unbiased evaluation of a final ECPM performance on the training data. In an embodiment, processing more training data than less training data will produce better results in error classification by the ECPM. At block 804, error classifier 606 trains error classification predictive model 607 using training data as input data. At block 806, error classifier 606 tests error classification predictive model 607 using testing data as input data. At block 808, error classifier 606 evaluates metrics produced during the training and testing phases of blocks 804 and 806. Metrics measure the accuracy of the error classification. Any suitable metric may be used. At block 810, if the model meets a predetermined threshold for error classification, then training and testing of the model is complete at block 814 (e.g., more tuning is not needed). In an embodiment, the threshold is set to 80% of the training and/or testing data. If the model does not meet the threshold at block 810, error classifier 606 tunes error classification predictive model 607 at block 812. In an embodiment, tuning comprises changing one or more parameters affecting operation of the ECPM. In an embodiment, tuning is performed by reducing the dimensionality of the data for better results. Further training and testing are performed back at blocks 804 and 806. When training and testing are complete, the model is ready for production use.

Returning back to FIG. 6, error classifier 606 classifies errors into either recoverable errors 608 or unrecoverable errors 610. Table 1 shows an example of raw text from logs 412 and the resulting classified errors after processing by log file transformer 602 and error classifier 606.

TABLE 1

| Raw Text from Data Replication | Error Type |
| --- | --- |
| 2019 Aug. 16 07:04:06,990 +3660224 ERROR {management.client.ManagementServerClient} Asynchronously setting component status to: [ERROR]: RepliCons-00013: Unrecognized PBC error | Unrecoverable |
| 2019 Aug. 16 06:16:25,800 +799034 ERROR {management.client.ManagementServerClient} Error OutOfMemoryError-heap dump unrecognized policy error | Unrecoverable |
| 2019 Aug. 16 07:03:06,974 +3600208 ERROR {client.jdbc.SlaveReplicationBatchConsumer} Error during start of transaction SCN: 4295222187: java.lang.RuntimeException: Error while determining connection generation: java.lang.RuntimeException: Previous transaction was not committed or rolled back properly | Recoverable |
| 2019 Aug. 16 07:03:06,974 +3600208 ERROR {client.jdbe.SlaveReplicationBatchConsumer} Error during start of transaction SCN: 4295222187: java.lang.RuntimeException: Error while determining connection generation: java.lang.RuntimeException: Previous transaction was not committed or rolled back properly | Recoverable |
| 2019 Aug. 16 06:16:25,800 +799034 ERROR {management.client.ManagementServerClient} Version mismatch for consumer with drivers | Recoverable |

In an embodiment, error classifier 606 further classifies the errors into sub-types and predetermined recovery jobs are performed for one or more error sub-types. In an embodiment, unrecoverable errors are further classified as one of the following sub-types: 1) hardware error; 2) policy-based cloning (PBC) failure; 3) out of memory error, in case of loading too much metadata or policies into relay 406 and/or consumer 408; 4) data bus error, when a data bus is choked with too large an amount of write and/or read actions from source database 404 to target database 410; and 5) catchup server 407 crash. In an embodiment, recoverable errors are further classified as one of the following sub-types: 1) version error due to mismatch of drivers, plugins or database services; 2) relay checkpoint error; 3) database schema metadata error; 4) replication policy transformation error; 5) storage limitation error; 6) transaction failure; 7) loss of source or target database connection; 8) sequence error of transactions; 9) ordering error of transactions; 10) data mismatch error; (11) caching error; and 12) data comparison error.

Figure 9:
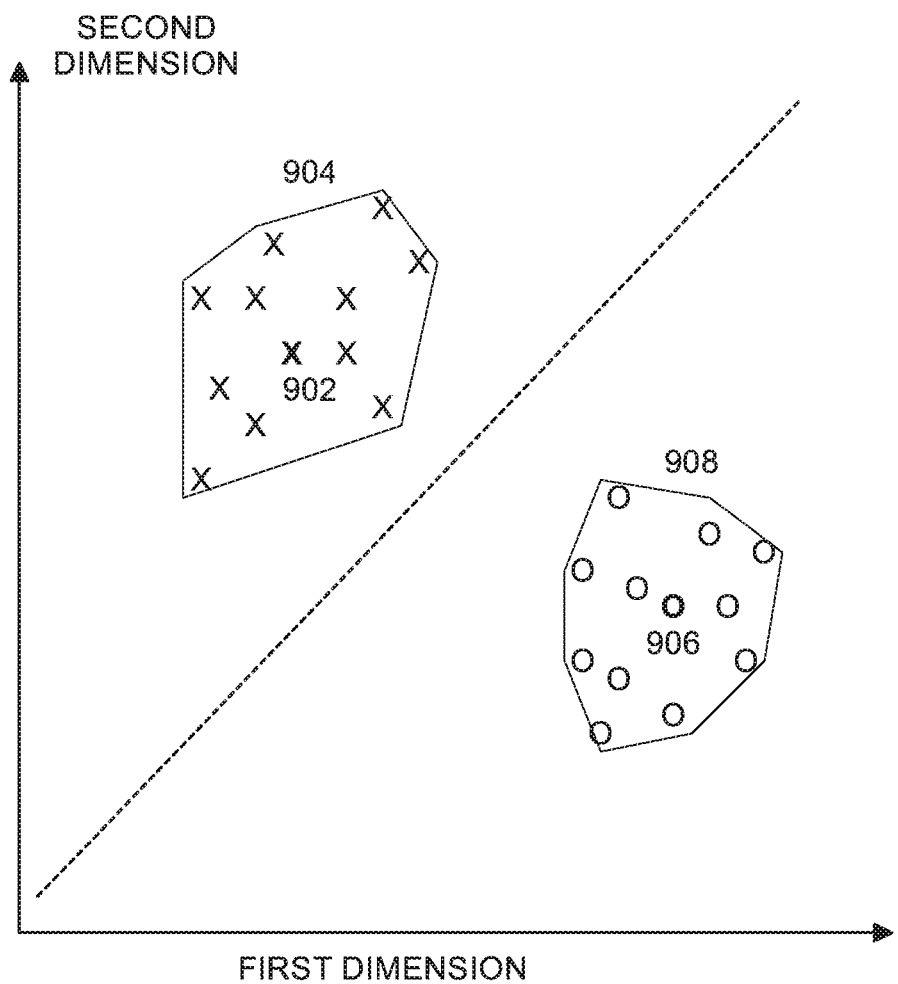
FIG. 9 is an example of a graphical representation of error classification according to some embodiments.

In an embodiment, error classification predictive model 607 performs binary classification on vectors 604. FIG. 9 is an example of a graphical representation of error classification according to some embodiments. In an embodiment, the vector representation is high dimensional data which may be difficult to visualize. To vector may be converted from a high dimensional space to a low dimensional space (e.g., two dimensions or three dimensions) without losing data. In the case of conversion, the x axis represents a first dimension and the y axis represents a second dimension. Vector data in the first and second dimension are numerical values. Error classifier 606 plots each error data value in a two dimensional system. Error classifier 606 also computes a mean error data value for recoverable errors 902 and a mean error data value for unrecoverable errors 906.

In one embodiment, error classifier 606 computes the mean error data value for the vector representation of all error data values obtained from logs 412 and sets the mean error data value as the center of a centroid (centroid for recoverable errors 904, centroid for unrecoverable errors 908):

$$\mu_i \left( \sum_{i=1}^{N} x_i \right) / N$$

where $\mu_i$ is the mean error data value, $x_i$ is each vector representation, and N is the total number of vector representations. This computation is done once for recoverable errors and once for unrecoverable errors. Error classifier 606 than classifies each error by determining the minimum distance between a vector point (e.g., for the current error being classified) to the mean error data value of each class of errors (recoverable and unrecoverable):

$$\mathrm{argmin} s \sum_{e=1}^{2} \sum_{x \in s_i} \|x - \mu_i\|^2$$

where e is the number of error classes; $s_i$ is the set of vector representations for each class, and $\mu_i$ is the mean error data value in $s_i$, and x is each vector representation.

Returning to FIG. 6, error analyzer 612 reads recoverable errors 608 and unrecoverable errors 610 as classified by error classifier 606. For each unrecoverable error, error analyzer 612 calls notifier 616 to notify and alert a database analyst that an unrecoverable error has occurred and the error cannot be proactively fixed. Thus, human analysis by the database analyst (e.g., the subject matter expert) is needed. For each recoverable error, error analyzer calls error recovery job controller 614 to trigger a recovery job to be performed by cloud computing environment 10. Error recovery job controller 614 reads the recovery jobs triggered by error analyzer 612 and reads the definition of each job. In one embodiment, job definitions are predefined templates written in Javascript object notation (JSON) or yet another markup language (YAML) syntax. Error recovery job controller 614 executes the recovery jobs or causes the recovery jobs to be executed and calls notifier 616 to report the status of recovery from a recoverable error.

Some examples of recoverable errors and associated recovery jobs are as follows. When the recoverable error is a resources error (e.g., storage/processor), error recovery job controller 614 identifies a baseline set of database services based on a defined threshold limit. If the limit is exceeded, error recovery job controller 614 triggers a Resource Exceed recovery job with relay 406 and/or consumer 408 service definition details for scale up/scale down of the resources. When the recoverable error is a version mismatch (e.g., Java database connectivity (JDBC) Drivers/Plugins/open database connectivity (ODBC)), error recovery job controller 614 downloads and deploys a stable version of docker images and/or libraries from a JFROG artifactory, as defined in the version mismatch deployment template through the recovery job. When the recoverable error is a data mismatch (e.g., transaction failure), error recovery job controller 614 reads a list of transaction IDs and creates a Transaction Failure recovery job with list of failed transaction IDs for read and/or write operations, and retries to establish a connection to the database. When the recoverable error is a database connection loss, error recovery job controller 614 reads the error and identifies the database details from a management service and creates a Database Connection Loss recovery job for re-establishing the connection.

Embodiments of the present invention automatically identify the different types of errors occurring during database replication processing and invoke recovery jobs to overcome recoverable errors. Embodiments prevent data loss during database replication, monitor for and provide alerts when database replication processing errors occur, identify data mismatch, version compatibility, and data recovery errors, and generally support more robust data replication processing for heterogeneous databases.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A system, comprising:
   a database system implemented using a server system, the database system configurable to cause:
   training a predictive model using a set of training data;
   performing database replication processing in a cloud computing environment such that one or more log files are generated, the one or more log files including text generated during the database replication processing;
   obtaining the text from the one or more log files;
   transforming the text into a plurality of vectors, each vector representing an instance of an error that occurred during database replication processing, wherein transforming the text includes:
   segmenting the text into sentences;
   segmenting the sentences into tokens such that segmented sentences are generated;
   tagging the tokens of the segmented sentences as parts of speech such that tagged sentences are generated;
   detecting entities in the tagged sentences;
   detecting relations among the entities; and
   converting the relations into vectors;
   classifying, using the predictive model, one or more errors based on the vectors as a recoverable error such that one or more recoverable errors are identified;
   determining, for the one or more recoverable errors based, at least in part, on corresponding error sub-types, one or more recovery jobs associated with database replication processing in the cloud computing environment; and
   automatically invoking the one or more recovery jobs, the one or more recovery jobs including re-executing at least a portion of the database replication processing.

2. The system of claim 1, the database system further configurable to cause:
   classifying, using the predictive model, at least a second error as an unrecoverable error based on at least one of the vectors;
   notifying a user that the unrecoverable error has occurred.

3. The system of claim 1, wherein transforming the text into a plurality of vectors comprises:
   segmenting the text into sentences;
   segmenting the sentences into tokens such that segmented sentences are generated;
   tagging the tokens of the segmented sentences as parts of speech such that tagged sentences are generated;
   detecting entities in the tagged sentences;
   detecting relations among the entities; and
   converting the relations into vectors.

4. The system of claim 1, wherein classifying the errors based on vectors comprises applying the predictive model to the vectors.

5. The system of claim 4, the database system further configurable to cause:
  splitting the vectors into training data and testing data;
  training the predictive model with the training data;
  testing the predictive model with the testing data;
  evaluating metrics obtained from the training and testing; and
  tuning error classification predictive model parameters of the predictive model based, at least in part, on the evaluated metrics.

6. The system of claim 5, wherein the predictive model performs binary classification on the vectors.

7. The system of claim 1, wherein classifying the errors includes classifying the errors into sub-types of errors; and
  determining at least one recovery job for each sub-type of the recoverable errors.

8. A computer-implemented method comprising:
  training a predictive model using a set of training data;
  performing database replication processing in a cloud computing environment such that one or more log files are generated, the one or more log files including text generated during the database replication processing;
  obtaining the text from the one or more log files;
  transforming the text into a plurality of vectors, each vector representing an instance of an error that occurred during database replication processing, wherein transforming the text includes:
    segmenting the text into sentences;
    segmenting the sentences into tokens such that segmented sentences are generated;
    tagging the tokens of the segmented sentences as parts of speech such that tagged sentences are generated;
    detecting entities in the tagged sentences;
    detecting relations among the entities; and
    converting the relations into vectors;
  classifying, using the predictive model, one or more errors based on the vectors as a recoverable error such that one or more recoverable errors are identified;
  determining, for the one or more recoverable errors based, at least in part, on corresponding error sub-types, one or more recovery jobs associated with database replication processing in the cloud computing environment; and
  automatically invoking the one or more recovery jobs, the one or more recovery jobs including re-executing at least a portion of the database replication processing.

9. The computer-implemented method of claim 8, further comprising
  classifying, using the predictive model, at least a second error as an unrecoverable error based on at least one of the vectors;
  notifying a user that the unrecoverable error has occurred.

10. The computer-implemented method of claim 8, wherein transforming the text into a plurality of vectors comprises:
  segmenting the text into sentences;
  segmenting the sentences into tokens;
  tagging the tokens of the segmented sentences as parts of speech such that tagged sentences are generated;
  detecting entities in the tagged sentences;
  detecting relations among the entities; and
  converting the relations into vectors.

11. The computer-implemented method of claim 8, wherein classifying one or more errors based on the vectors comprises applying the predictive model to the vectors.

12. The computer-implemented method of claim 11, further comprising:
  splitting the vectors into training data and testing data;
  training the predictive model with the training data;
  testing the predictive model with the testing data;
  evaluating metrics obtained from the training and testing; and
  tuning error classification predictive model parameters of the predictive model based, at least in part, on the evaluated metrics.

13. The computer-implemented method of claim 8, wherein the predictive model performs binary classification on the vectors.

14. The computer-implemented method of claim 8, further comprising:
  classifying the errors into sub-types of errors; and
  for each sub-type of the recoverable errors, determine at least one recovery job.

15. A tangible, non-transitory computer-readable storage medium having instructions stored thereon which, when executed by a processing device, cause the processing device to:
  train a predictive model using a set of training data;
  perform database replication processing in a cloud computing environment such that one or more log files are generated, the one or more log files including text generated during the database replication processing;
  obtain the text from the one or more log files;
    transform the text into a plurality of vectors, each vector representing an instance of an error that occurred during database replication processing, wherein transforming the text includes:
    segmenting the text into sentences;
    segmenting the sentences into tokens such that segmented sentences are generated;
    tagging the tokens of the segmented sentences as parts of speech such that tagged sentences are generated;
    detecting entities in the tagged sentences;
    detecting relations among the entities; and
    converting the relations into vectors;
  classify, using the predictive model, one or more errors based on the vectors as a recoverable error such that one or more recoverable errors are identified;
  determine, for the one or more recoverable errors based, at least in part, on corresponding error sub-types, one or more recovery jobs associated with database replication processing in the cloud computing environment; and
  automatically invoke the one or more recovery jobs, the one or more recovery jobs including re-executing at least a portion of the database replication processing.

16. The tangible, non-transitory computer-readable storage medium of claim 15, having instructions stored thereon which, when executed by the processing device, cause the processing device to:
  classify, using the predictive model, at least a second error as an unrecoverable error based on at least one of the vectors;
  notify a user that the unrecoverable error has occurred.

17. The tangible, non-transitory computer-readable storage medium of claim 15, wherein instructions to transform the text comprise instructions stored thereon that, in response to execution by the processing device, cause the processing device to:
  segment the text into sentences;
  segment the sentences into tokens such that tokenized sentences are generated;

tag the tokens of the tokenized sentences as parts of speech such that tagged sentences are generated;
detect entities in the tagged sentences;
detect relations among the entities; and
convert the relations into vectors.

18. The tangible, non-transitory computer-readable storage medium of claim 15, wherein instructions to classify one or more errors apply the predictive model to the vectors.

19. The tangible, non-transitory computer-readable storage medium of claim 18, further comprising instructions stored thereon that, in response to execution by the processing device, cause the processing device to:
split the vectors into training data and testing data;
train the predictive model with the training data;
test the predictive model with the testing data;
evaluate metrics obtained from the training and testing; and
tune predictive model parameters of the predictive model based, at least in part, on the evaluated metrics.

20. The tangible, non-transitory computer-readable storage medium of claim 19, wherein the predictive model performs binary classification on the vectors.

21. The tangible, non-transitory computer-readable storage medium of claim 15, further comprising instructions stored thereon that, in response to execution by the processing device, cause the processing device to:
classify the errors into sub-types of errors; and
determine, for each sub-type of the recoverable errors, at least one recovery job.

\* \* \* \* \*